United States Patent
Strange et al.

(10) Patent No.: US 12,013,190 B2
(45) Date of Patent: Jun. 18, 2024

(54) WAVY ADJACENT PASSAGE HEAT EXCHANGER CORE AND MANIFOLD

(71) Applicant: Hamilton Sundstrand Corporation, Charlotte, NC (US)

(72) Inventors: Jeremy M. Strange, Windsor, CT (US); Gabriel Ruiz, Broad Brook, CT (US); Mark A. Zaffetti, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 98 days.

(21) Appl. No.: 17/355,808

(22) Filed: Jun. 23, 2021

(65) Prior Publication Data
US 2022/0412668 A1 Dec. 29, 2022

(51) Int. Cl.
| | |
|---|---|
| *F28F 1/02* | (2006.01) |
| *B23P 15/26* | (2006.01) |
| *F28F 9/00* | (2006.01) |
| *F28F 9/22* | (2006.01) |

(52) U.S. Cl.
CPC ............ *F28F 1/022* (2013.01); *B23P 15/26* (2013.01); *F28F 9/00* (2013.01); *F28F 9/005* (2013.01); *F28F 9/22* (2013.01)

(58) Field of Classification Search
CPC .... F28F 1/022; F28F 9/00; F28F 9/005; F28F 9/22; B23P 15/26
See application file for complete search history.

(56) References Cited

U.S. PATENT DOCUMENTS

| | | | | |
|---|---|---|---|---|
| 822,996 | A * | 6/1906 | Smith | F28F 1/022 165/177 |
| 2,782,009 | A * | 2/1957 | Edward | F28D 9/0062 165/DIG. 387 |
| 3,255,816 | A * | 6/1966 | Rosenblad | F28D 9/0062 165/166 |
| 4,183,403 | A * | 1/1980 | Nicholson | F28F 3/046 165/DIG. 387 |

(Continued)

FOREIGN PATENT DOCUMENTS

CN 104776736 B 3/2017

OTHER PUBLICATIONS

European Search Report for European Application No. 22179568.5; dated Oct. 31, 2022, 59 pages.

*Primary Examiner* — Raheena R Malik
(74) *Attorney, Agent, or Firm* — CANTOR COLBURN LLP

(57) ABSTRACT

A heat exchanger includes a first fluid inlet, a first fluid outlet, a second fluid inlet, a second fluid outlet, and a core section. The core section includes a plurality of first fluid passages through which a first fluid is flowed, and a plurality of second fluid passages through which a second fluid is flowed to exchange thermal energy with the first fluid. The first fluid passages and the second fluid passages extend non-linearly along a length of the first fluid passages and the second fluid passages between a first core end and a second core end opposite the first core end. A manifold is operably connected to the plurality of first fluid passages. The manifold includes a plurality of lateral passages intersecting the plurality of first fluid passages. The plurality of lateral passages vary in length depending on distance from a fluidly upstream end of the core section.

9 Claims, 5 Drawing Sheets

(56) References Cited

U.S. PATENT DOCUMENTS

| | | | | |
|---|---|---|---|---|
| 6,267,176 B1 * | 7/2001 | Bolla | F28D 9/0062 | |
| | | | 165/DIG. 387 | |
| 6,364,007 B1 * | 4/2002 | Fischer | F28D 9/0037 | |
| | | | 165/170 | |
| 6,623,687 B1 * | 9/2003 | Gervasi | B29C 64/40 | |
| | | | 264/401 | |
| 7,106,777 B2 * | 9/2006 | Delgado, Jr. | H01S 3/095 | |
| | | | 372/89 | |
| 7,687,132 B1 * | 3/2010 | Gross | B22F 3/002 | |
| | | | 428/116 | |
| 7,866,377 B2 * | 1/2011 | Slaughter | F28F 13/00 | |
| | | | 700/120 | |
| 8,573,289 B1 * | 11/2013 | Roper | F28D 7/0066 | |
| | | | 165/173 | |
| 9,453,604 B1 * | 9/2016 | Maloney | B29C 33/40 | |
| 9,618,278 B2 * | 4/2017 | Denkenberger | B21D 53/045 | |
| 9,890,827 B2 * | 2/2018 | Schaedler | B60N 3/048 | |
| 10,175,003 B2 * | 1/2019 | Sennoun | F28F 7/02 | |
| 10,203,169 B2 * | 2/2019 | Ghioni | F28D 15/046 | |
| 10,502,501 B1 * | 12/2019 | Roper | F28D 1/04 | |
| 10,556,670 B2 * | 2/2020 | Koppelman | B64C 3/26 | |
| 10,809,007 B2 * | 10/2020 | Martinez | F28D 7/0033 | |
| 10,962,293 B2 | 3/2021 | Tajiri et al. | | |
| 11,226,158 B2 * | 1/2022 | Streeter | F28F 1/006 | |
| 11,255,615 B2 * | 2/2022 | Streeter | F28F 9/0246 | |
| 11,384,992 B2 * | 7/2022 | Suzuki | F28D 9/00 | |
| 11,493,286 B1 * | 11/2022 | Kirsch | B33Y 80/00 | |
| 2008/0149313 A1 * | 6/2008 | Slaughter | B22F 10/28 | |
| | | | 430/269 | |
| 2010/0051248 A1 * | 3/2010 | Inatomi | F28F 3/04 | |
| | | | 165/166 | |
| 2010/0300669 A1 * | 12/2010 | Jacobsen | F28F 13/003 | |
| | | | 165/104.34 | |
| 2014/0231057 A1 * | 8/2014 | Schalansky | F28F 9/02 | |
| | | | 165/169 | |
| 2014/0251585 A1 * | 9/2014 | Kusuda | F28D 1/0226 | |
| | | | 165/164 | |
| 2016/0108815 A1 * | 4/2016 | Schmitz | F28D 1/0476 | |
| | | | 29/890.03 | |
| 2016/0282061 A1 * | 9/2016 | Veilleux, Jr. | B22F 5/106 | |
| 2017/0023311 A1 * | 1/2017 | Urbanski | F28F 3/10 | |
| 2017/0082372 A1 * | 3/2017 | Vos | H01L 23/473 | |
| 2017/0089643 A1 * | 3/2017 | Arafat | F28F 7/02 | |
| 2017/0146305 A1 * | 5/2017 | Kuczek | F28F 9/0268 | |
| 2017/0248372 A1 * | 8/2017 | Erno | F28D 9/0012 | |
| 2018/0328673 A1 * | 11/2018 | Stoia | B23P 15/26 | |
| 2020/0182559 A1 * | 6/2020 | Yun | F28D 7/1661 | |
| 2020/0309459 A1 * | 10/2020 | Streeter | B22F 5/10 | |
| 2020/0363133 A1 * | 11/2020 | Gerstler | F28D 7/005 | |
| 2021/0033354 A1 * | 2/2021 | Streeter | F28F 1/003 | |
| 2021/0116186 A1 * | 4/2021 | Horoszczak | F28D 7/06 | |
| 2021/0254896 A1 * | 8/2021 | Borghese | F28F 21/084 | |
| 2021/0325129 A1 * | 10/2021 | Spangler | F28F 3/048 | |
| 2022/0205735 A1 * | 6/2022 | Lynch | B33Y 80/00 | |
| 2022/0412668 A1 * | 12/2022 | Strange | F28F 9/0268 | |

* cited by examiner

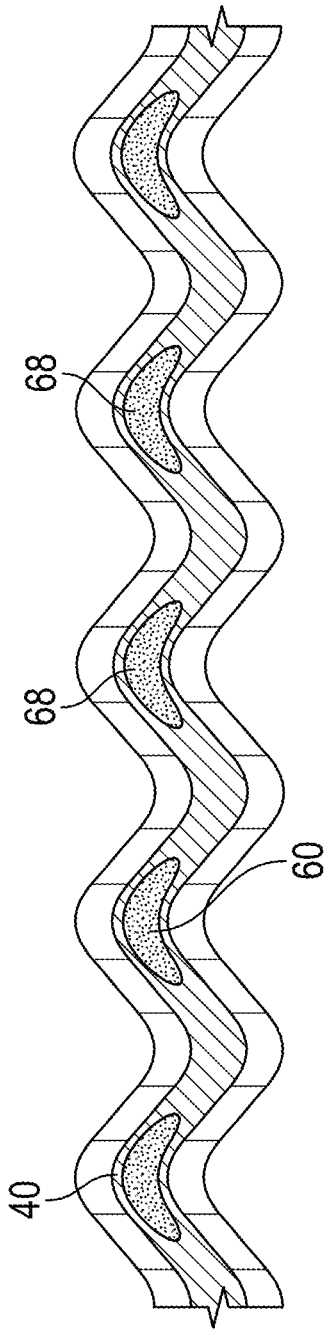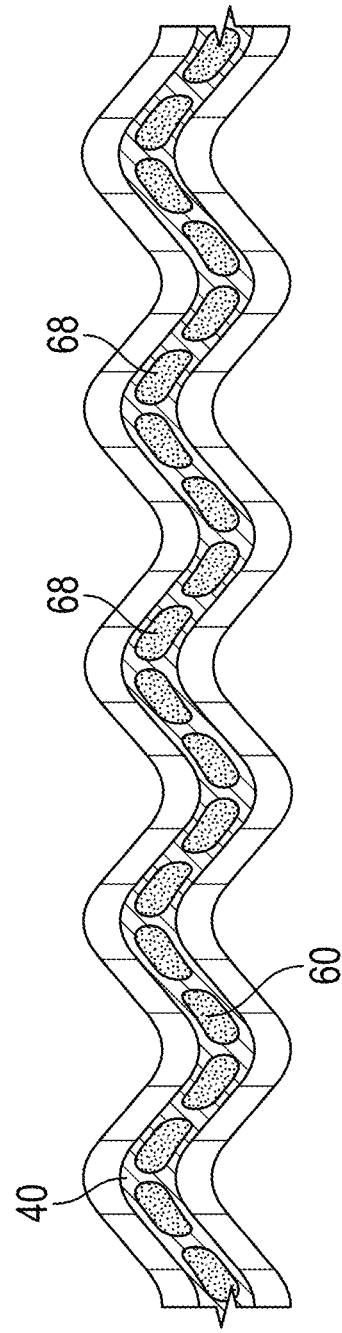
FIG. 4A
FIG. 4B

WAVY ADJACENT PASSAGE HEAT EXCHANGER CORE AND MANIFOLD

BACKGROUND

Exemplary embodiments pertain to the art of heat exchangers, and more particularly to flow passage configurations of heat exchangers.

Heat exchangers are a technology used throughout the aerospace industry as well as in other industries. These devices are utilized to transfer thermal energy from a relatively hot fluid flow to one or more relatively cold fluid flows and perform numerous essential functions, for example, cooling vehicle electronics and other systems or conditioning an environment to keep astronauts comfortable in space. The presence of multiple fluid loops often requires innovative manifold configurations in order to effectively and efficiently distribute the fluid flows to their respective fluid passages in the heat exchanger, without impairing heat transfer capability.

One typical heat exchanger configuration is a plate-fin heat exchanger, in which components are stacked and brazed to form a completed heat exchanger. Depending on complexity of the construction, such heat exchangers may have hundreds of components which are assembled into the completed heat exchanger. Such assembly can be costly and cumbersome, and the assembly introduces limitations to the configuration of the heat exchanger, such as passage shape and orientation. The art would appreciate improvements to more efficiently manufacture heat exchangers and provide greater efficiency in thermal energy transfer in heat exchangers.

BRIEF DESCRIPTION

In one embodiment, a heat exchanger includes a first fluid inlet, a first fluid outlet, a second fluid inlet, a second fluid outlet, and a core section. The core section includes a plurality of first fluid passages through which a first fluid is flowed from the first fluid inlet to the first fluid outlet, and a plurality of second fluid passages through which a second fluid is flowed from the second fluid inlet to the second fluid outlet to exchange thermal energy with the first fluid. The plurality of first fluid passages and the plurality of second fluid passages extend non-linearly along a length of the plurality of first fluid passages and the plurality of second fluid passages between a first core end and a second core end opposite the first core end. A manifold is operably connected to the plurality of first fluid passages. The manifold includes a plurality of lateral passages intersecting the plurality of first fluid passages. The plurality of lateral passages vary in length depending on distance from a fluidly upstream end of the core section.

Additionally or alternatively, in this or other embodiments the length of the plurality of lateral passages increases with increasing distance from the fluidly upstream end of the core section.

Additionally or alternatively, in this or other embodiments the length of the plurality of lateral passages varies parabolically.

Additionally or alternatively, in this or other embodiments the plurality of lateral passages are defined by a plurality of cutouts in the plurality of first fluid passages.

Additionally or alternatively, in this or other embodiments the plurality of lateral passages extend perpendicular to the plurality of first fluid passages.

Additionally or alternatively, in this or other embodiments the plurality of first fluid passages and the plurality of second fluid passages extend sinusoidally between the first core end and the second core end.

Additionally or alternatively, in this or other embodiments the plurality of first fluid passages are each separated from the plurality of second fluid passages by a passage wall through which the thermal energy is exchanged.

Additionally or alternatively, in this or other embodiments the first fluid flows through the core section in a first direction and the second fluid flows through the core section in a second direction opposite the first direction.

Additionally or alternatively, in this or other embodiments the heat exchanger includes a plurality of third fluid passages through which a third fluid is flowed to exchange thermal energy with the second fluid.

Additionally or alternatively, in this or other embodiments each second fluid passage of the plurality of second fluid passages is located between a first fluid passage of the plurality of first fluid passages and a third fluid passage of the plurality of third fluid passages.

Additionally or alternatively, in this or other embodiments the plurality of first fluid passages, the plurality of second fluid passages and the plurality of third fluid passages extend parallelly between the first core end and the second core end.

In another embodiment, a method of forming a heat exchanger includes defining a repeating cross-sectional portion of a core section, including at least a first fluid passage for conveyance of a first fluid and a second fluid passage for conveyance of a second fluid. The cross-sectional portion is repeated along a first direction and a second direction to define a full cross-section of the core section of the heat exchanger. The full cross-section is extended along a non-linear path between a first core section end and a second core section end. A plurality of lateral passages are formed intersecting the plurality of first fluid passages, the plurality of lateral passages varying in length depending on distance from a fluidly upstream end of the core section.

Additionally or alternatively, in this or other embodiments the length of the plurality of lateral passages increases with increasing distance from the fluidly upstream end of the core section.

Additionally or alternatively, in this or other embodiments the length of the plurality of lateral passages varies parabolically.

Additionally or alternatively, in this or other embodiments the plurality of lateral passages are defined by a plurality of cutouts in the plurality of first fluid passages.

Additionally or alternatively, in this or other embodiments the plurality of lateral passages extend perpendicular to the plurality of first fluid passages.

Additionally or alternatively, in this or other embodiments the non-linear path is sinusoidal.

Additionally or alternatively, in this or other embodiments the repeating cross-sectional portion further includes a third fluid passage for conveyance of a third fluid.

Additionally or alternatively, in this or other embodiments the heat exchanger is formed by one or more additive manufacturing processes.

BRIEF DESCRIPTION OF THE DRAWINGS

The following descriptions should not be considered limiting in any way. With reference to the accompanying drawings, like elements are numbered alike:

FIG. 4a is an illustration of an embodiment of a manifold passage of a heat exchanger;

FIG. 4b is an illustration of another embodiment of a manifold passage of a heat exchanger.

DETAILED DESCRIPTION

A detailed description of one or more embodiments of the disclosed apparatus and method are presented herein by way of exemplification and not limitation with reference to the Figures.

Figure 1:
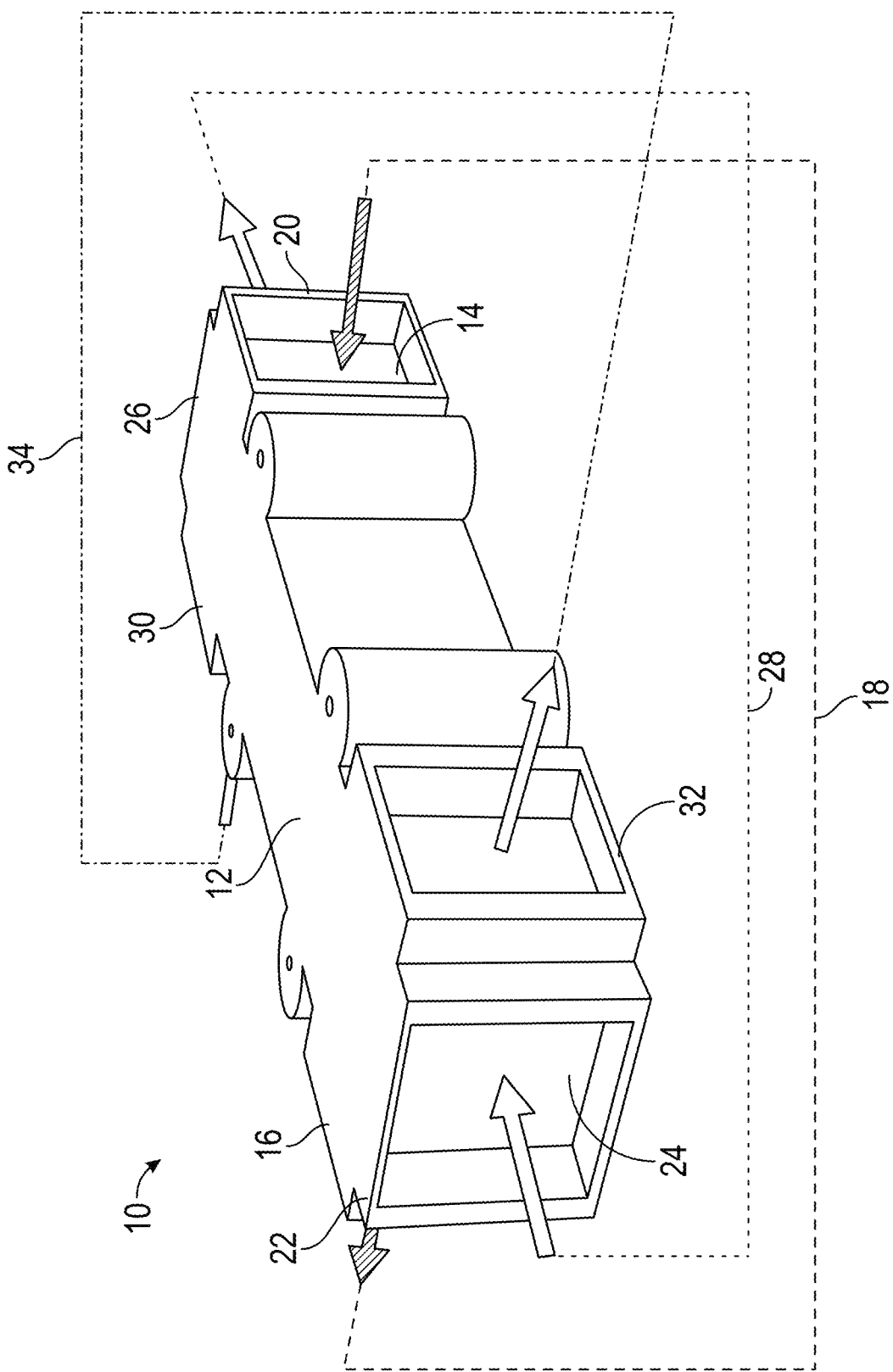
FIG. 1 is a schematic view of an embodiment of a heat exchanger

Referring now to FIG. 1, illustrated is a schematic view of an embodiment of a heat exchanger 10. In the embodiment illustrated, the heat exchanger 10 is a three-loop heat exchanger 10, meaning three separate fluid flows are circulated therethrough and exchange thermal energy in a core 12 of the heat exchanger 10. The heat exchanger 10 includes a first loop inlet 14 and a first loop outlet 16 for a first fluid loop 18. In some embodiments, the first loop inlet 14 is located at a first heat exchanger end 20 of the heat exchanger 10 and the first loop outlet 16 is located at a second heat exchanger end 22 opposite the first heat exchanger end 20. The heat exchanger 10 further includes a second loop inlet 24 and a second loop outlet 26 of a second fluid loop 28, and a third loop inlet 30 and a third loop outlet 32 of a third fluid loop 34. Each of the first fluid loop 18, the second fluid loop 28 and the third fluid loop 34 have a respective first fluid, second fluid and third fluid circulating therethrough. In some embodiments, the first fluid, the second fluid and the third fluid are all different fluids, while in other embodiments two or more of the first fluid, the second fluid and the third fluid may be the same fluid. While three fluid loops are illustrated and described herein with heat exchanger 10, one skilled in the art will readily appreciate that a three-loop configuration is merely exemplary, and that the present disclosure may be readily applied to heat exchanger 10 configurations accommodating two, four or more fluid loops.

Figure 2:
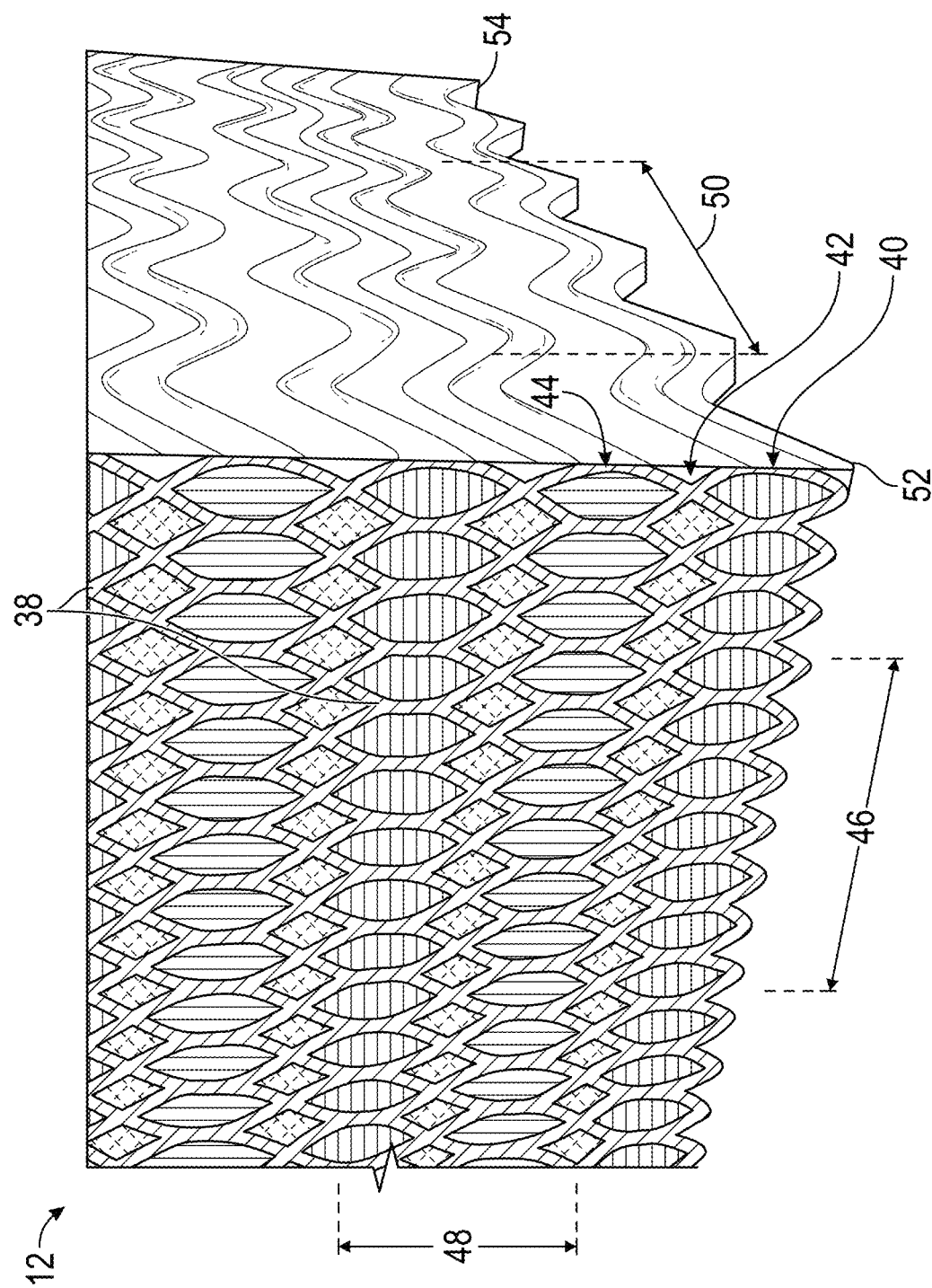
FIG. 2 is a schematic illustration of an embodiment of a core section of a heat exchanger.

Referring now to FIG. 2, illustrated is a cross-sectional view of a core 12 of the heat exchanger 10. The core 12 is the portion of the heat exchanger where the thermal energy transfer occurs, after the fluids enter the heat exchanger through their respective fluid loop inlets. The core 12 includes a plurality of passages separated by passage walls 38. The plurality of passages includes a plurality of first fluid passages 40, a plurality of second fluid passages 42 and a plurality of third fluid passages 44. In some embodiments, the first fluid passages 40, second fluid passages 42 and the third fluid passages 44 are arranged in rows that extend, for example, in a first direction 46, such as across a width of the core 12. The rows are stacked or arranged along a second direction 48, such as a height of the core 12. In some embodiments, such as shown, the fluid passages are polygonal, such as rhombus-shaped to increase the amount of surface contact between adjacent fluid passages and between adjacent rows of fluid passages. In some embodiments, each of the first fluid passages 40 and the third fluid passages 44 contain a relatively cold first fluid and third fluid, respectively, while the second fluid passages 42 contain a relatively hot second fluid. The rows of fluid passages are arranged or stacked such that each row of second fluid passages 42 is located between a row of first fluid passages 40 and a row of third fluid passages 44. One skilled in the art, however, will readily appreciate that other arrangements of rows may be utilized.

The first fluid passages 40, the second fluid passages 42 and the third fluid passages 44 all extend along a third direction 50, such as a length of the core 12. The fluid passages 40, 42, 44 extend non-linearly along the third direction 50 between a first core end 52 and a second core end 54. In some embodiments, the fluid passages 40, 42, 44 extend along a sinusoidal path or other tortuous path generally along the third direction between the first core end 52 and the second core end 54. Further, in some embodiments, the fluid passages 40, 42, 44 extend parallelly along the sinusoidal or tortuous path. The use of the sinusoidal or tortuous path increases the primary heat exchange surface area along a given length of the core 12 and increases turbulence in the flow of the first fluid, second fluid and third fluid thereby improving the efficiency of the thermal energy exchange.

In some embodiments, the heat exchanger 10 is a counterflow heat exchanger in which one or more of the first fluid, second fluid or third fluid flows through the core 12 in a first direction from the first core end 52 to the second core end 54 and the other fluids flow in a second direction opposite the first direction. In other embodiments, however, the heat exchanger 10 is a parallel flow heat exchanger in which all of the first fluid, the second fluid and the third fluid flow through the core 12 in the same direction.

Figure 3:
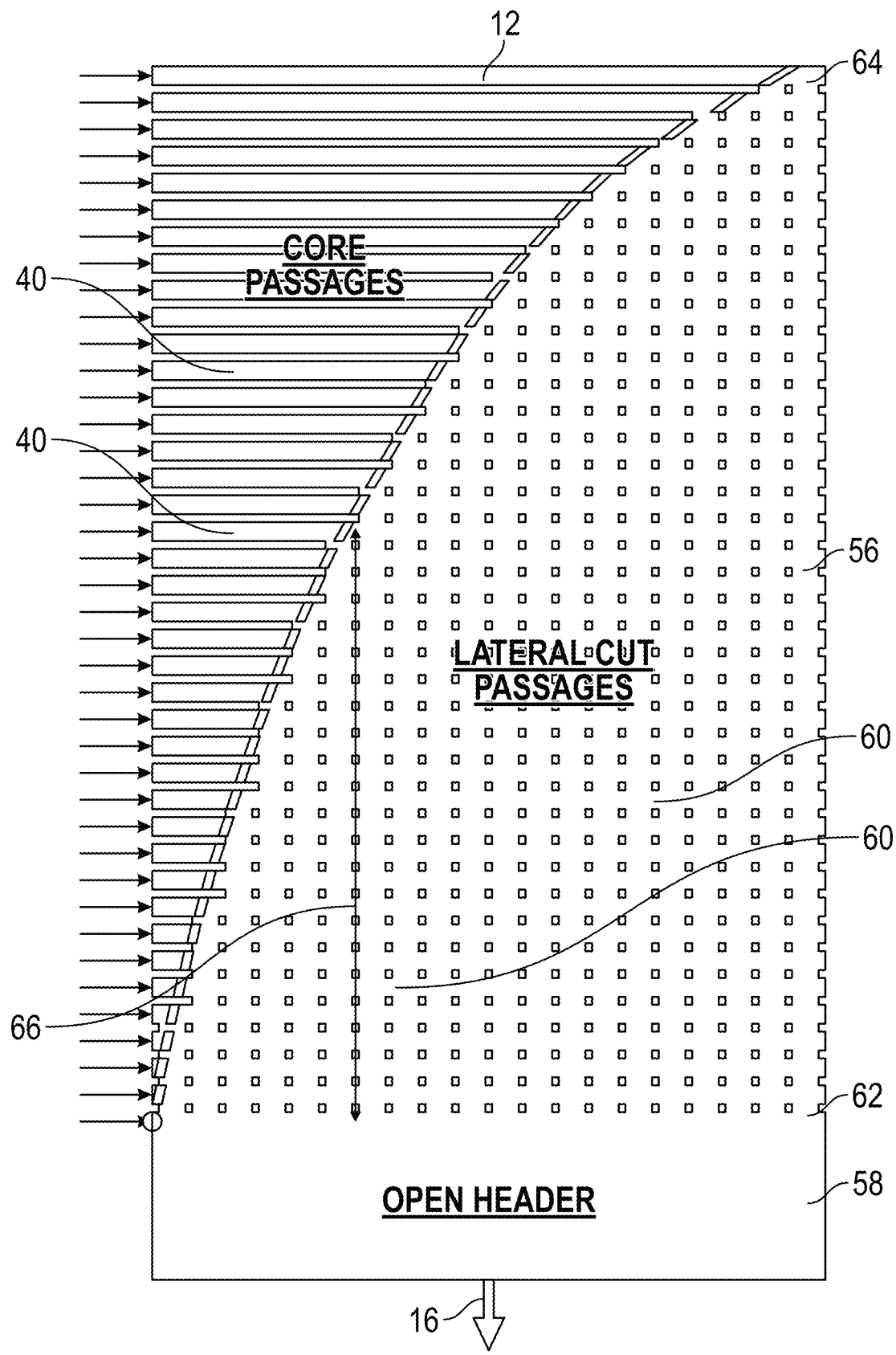
FIG. 3 is a schematic illustration of a manifold arrangement of a heat exchanger.

Referring now to FIG. 3, in some embodiments one or more of the fluid loop inlets 14, 24, 30 shown in FIG. 1 are located along the side of the heat exchanger 10 such that the respective fluid is directed into the core 12 in a direction non-parallel to the fluid passages 40, 42, 44 indicated in FIG. 2. In some embodiments, the fluid is directed into the core 12 substantially perpendicular to the fluid passages 40, 42, 44. Similarly, in some embodiments, one or more of the fluid loop outlets 16, 26, 32 shown in FIG. 1 are located along the side of the heat exchanger 10 such that the respective fluid is directed from the core 12 in a direction non-parallel to the fluid passages 40, 42, 44. In some embodiments, the fluid is directed from the core 12 substantially perpendicular to the fluid passages 40, 42, 44. In one embodiment, such as shown in FIG. 1, fluid loop outlets 16 and 32 are non-parallel to the fluid passages while outlet 26 is parallel to the fluid passages.

To accomplish this, a manifold 56 is connected to the core 12. For example, regarding the first fluid loop 18 indicated in FIG. 1, the first loop outlet 16 includes manifold 56 which collects the first fluid flow from the plurality of first fluid passages 40 and directs the first fluid flow to a header 58. The manifold 56 includes a plurality of lateral passages 60 extending across the first fluid passages 40. The lateral passages 60 each have a first passage end 62 located at the header 58, and a second passage end 64 opposite the first passage end 62 defining a passage depth 66. The lateral passages 60 have variable passage depth 66, such that lateral passages 60 located further upstream relative to the flow direction through the first fluid passages 40 have a relatively short passage depth 66 compared to the passage depth 66 of those lateral passages 60 located further downstream relative to the flow direction through the first fluid passages 40. In some embodiments, the variable passage depth 66 is configured such that the second passage ends 64 of the plurality of lateral passages 60 define a parabolic shape.

Referring to FIGS. 4a and 4b, the lateral passages 60 are defined by cutouts 68 through the first fluid passages 40. The cutouts 68 are sized and configured to allow the lateral flow from the first fluid passages 40, while avoiding or not encroaching on the second fluid passages 42 and the third fluid passages 44. While the description herein relates to lateral passages 60 at the first fluid outlet 16, one skilled in the art will readily appreciate that the present disclosure may also readily be applied at the fluid loop inlets 14, 24, 30 and other fluid loop outlets 26 and 32.

Figure 5:
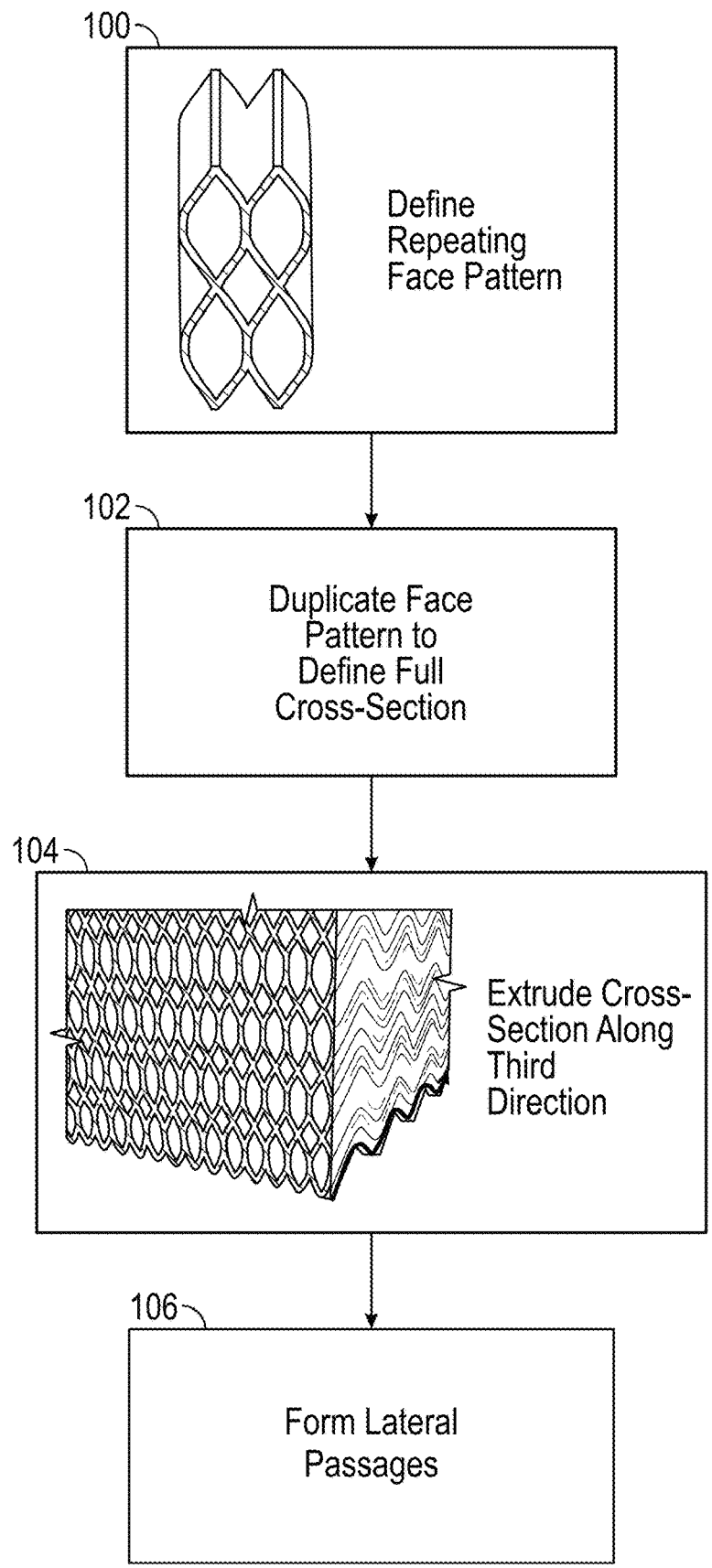
FIG. 5 is an illustration of a method of forming a heat exchanger.

Referring now to FIG. 5, to form the heat exchanger 10, a repeating face pattern of the core 12 is defined at step 100. The pattern defines the arrangements and relative sizes and cross-sectional shapes of the fluid passages 40, 42, 44 by defining the passage walls 38. The face pattern 56 is duplicated as needed to define a full cross-sectional shape of the core 12 at step 102. At step 104, the cross-sectional shape of the core 12 is extruded generally along the third direction 50, and specifically along the desired sine wave path or other tortuous path direction to fully define the core 12. In some embodiments, the core 12 is formed by one or more additive manufacturing processes. At step 106, the lateral passages 60 are formed into the core section 12, in some embodiments by one or more additive manufacturing processes.

The cutouts 68, formed as part of the processes that form the lateral passages 60 at step 106, provide seamless side entry and side exit paths without introducing complex geometric features that would complicate the manufacturing process. Further, the cutouts 68 do not significantly reduce thermal energy transfer, compared to other manifolding concepts. The passage depth 66 of each lateral passage 60 may be tailored to optimize pressure drop and flow distribution, and the quantity and shape of the lateral passages 60 may be tailored to minimize pressure drop.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat exchanger, comprising:
    a first fluid inlet;
    a first fluid outlet;
    a second fluid inlet;
    a second fluid outlet;
    a core section, including:
        a plurality of first fluid passages through which a first fluid is flowed from the first fluid inlet to the first fluid outlet;
        a plurality of second fluid passages through which a second fluid is flowed from the second fluid inlet to the second fluid outlet to exchange thermal energy with the first fluid;
        wherein the plurality of first fluid passages and the plurality of second fluid passages extend non-linearly along a length of the plurality of first fluid passages and the plurality of second fluid passages between a first core end and a second core end opposite the first core end;
        a manifold operably connected to the plurality of first fluid passages, the manifold including a plurality of lateral passages intersecting the plurality of first fluid passages, the plurality of lateral passages varying in length depending on distance from a fluidly upstream end of the core section;
        wherein the plurality of lateral passages is fluidly connected to the first fluid inlet such that the first fluid is conveyed to the plurality of first fluid passages via the plurality of lateral passages, the first fluid directed into the plurality of first fluid passages in a direction perpendicular to the first fluid passages; and
        wherein the plurality of lateral passages are defined by a plurality of cutouts in a passage wall of the plurality of first fluid passages.

2. The heat exchanger of claim 1, wherein the length of the plurality of lateral passages increases with increasing distance from the fluidly upstream end of the core section.

3. The heat exchanger of claim 1, wherein the length of the plurality of lateral passages varies parabolically.

4. The heat exchanger of claim 1, wherein the plurality of first fluid passages and the plurality of second fluid passages extend sinusoidally between the first core end and the second core end.

5. The heat exchanger of claim 1, wherein the plurality of first fluid passages are each separated from the plurality of second fluid passages by a passage wall through which the thermal energy is exchanged.

6. The heat exchanger of claim 1, wherein the first fluid flows through the core section in a first direction and the second fluid flows through the core section in a second direction opposite the first direction.

7. The heat exchanger of claim 1, further comprising a plurality of third fluid passages through which a third fluid is flowed to exchange thermal energy with the second fluid.

8. The heat exchanger of claim 7, wherein each second fluid passage of the plurality of second fluid passages is located between a first fluid passage of the plurality of first fluid passages and a third fluid passage of the plurality of third fluid passages.

9. The heat exchanger of claim 7, wherein the plurality of first fluid passages, the plurality of second fluid passages and the plurality of third fluid passages extend parallelly between the first core end and the second core end.

* * * * *